United States Patent [19]

Johnson et al.

[11] 4,017,940

[45] Apr. 19, 1977

[54] METHOD AND APPARATUS FOR STUFFING LOAF MOLDS

[75] Inventors: Charles H. Johnson; Carroll P. Hartl, both of Madison, Wis.

[73] Assignee: Oscar Mayer & Co. Inc., Madison, Wis.

[22] Filed: Mar. 11, 1975

[21] Appl. No.: 557,399

[52] U.S. Cl. .................................. 17/32; 141/263
[51] Int. Cl.² ......................................... A22C 7/00
[58] Field of Search .......... 141/263, 164, 258, 264, 141/253, 251; 17/32

[56] References Cited

UNITED STATES PATENTS

| | | | |
|---|---|---|---|
| 3,237,662 | 3/1966 | Hawley | 17/32 |
| 3,485,274 | 12/1969 | Travlos | 141/263 |
| 3,777,331 | 12/1973 | Felborg | 17/32 |

*Primary Examiner*—Robert Peshock
*Attorney, Agent, or Firm*—Lockwood, Dewey, Zickert & Alex

[57] ABSTRACT

A method for stuffing meat material into loaf molds for processing in a continuous loaf processing system where the loaf is open at one end and closed at the other end, and which includes the steps of moving the mold onto a stuffing horn until the stuffing horn is positioned at the closed end of the mold, discharging pressurized meat material from the stuffing horn and causing the mold to be filled and to be moved off the stuffing horn, controlling the return of movement of the mold off the stuffing horn, and ending the discharge of the meat material from the stuffing horn when the mold is filled. The apparatus includes a stuffing platform having a mold supporting carriage movable therealong, a stationary stuffing horn, control means for initiating and ending discharge of meat material from the stuffing horn, and means for controlling the rate of stuffing.

10 Claims, 13 Drawing Figures

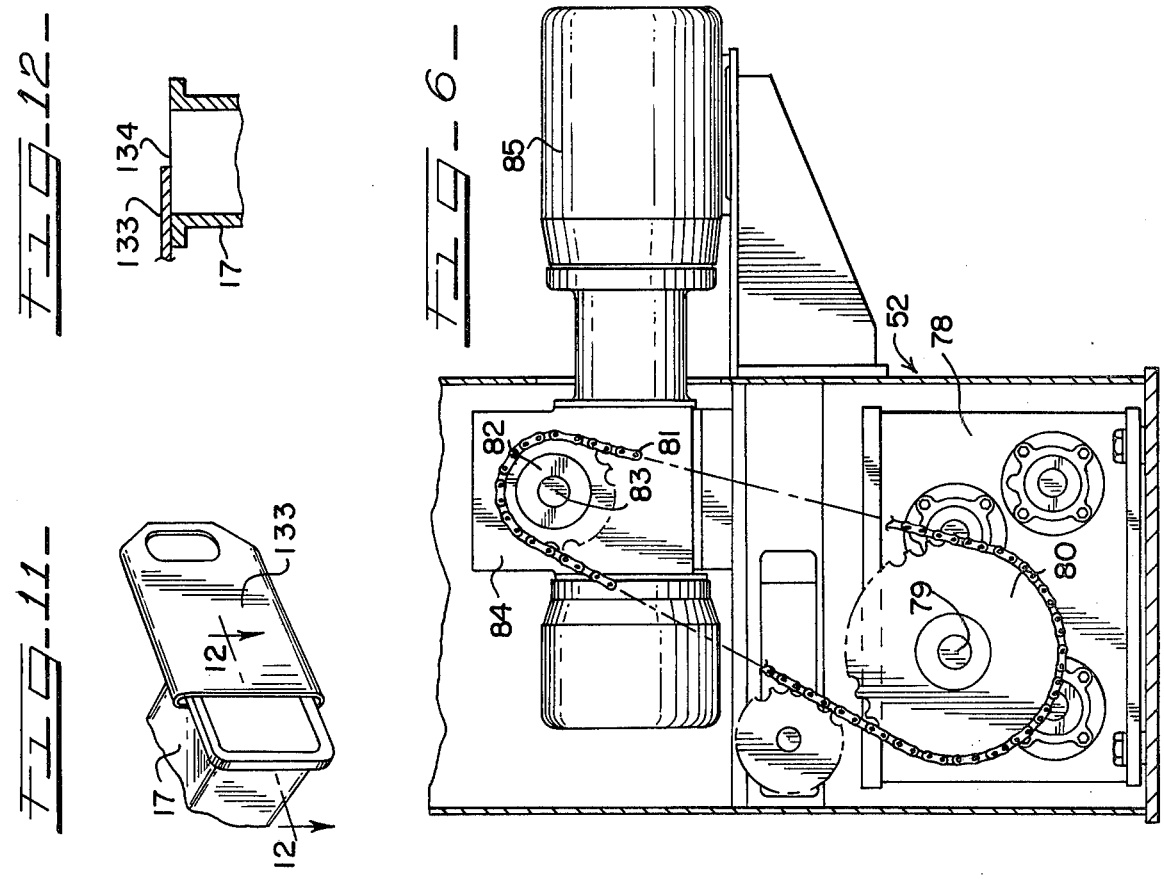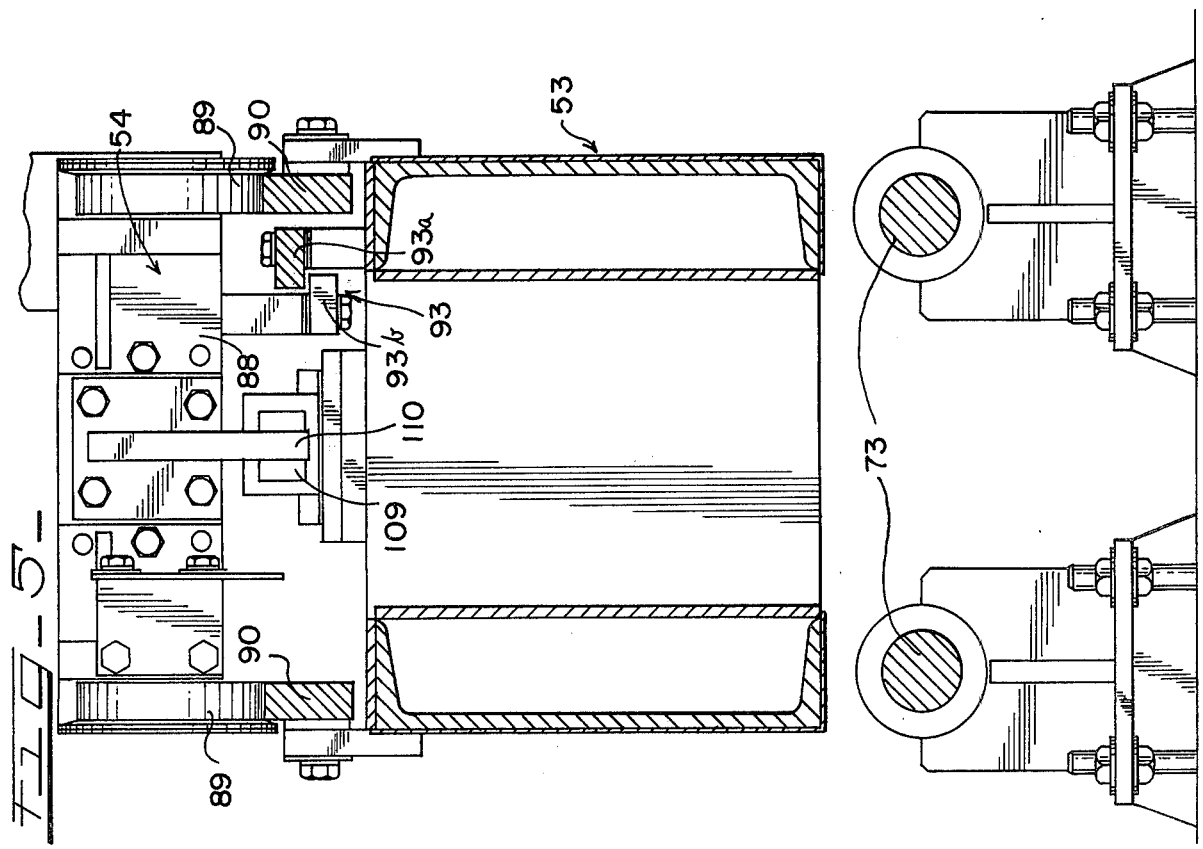

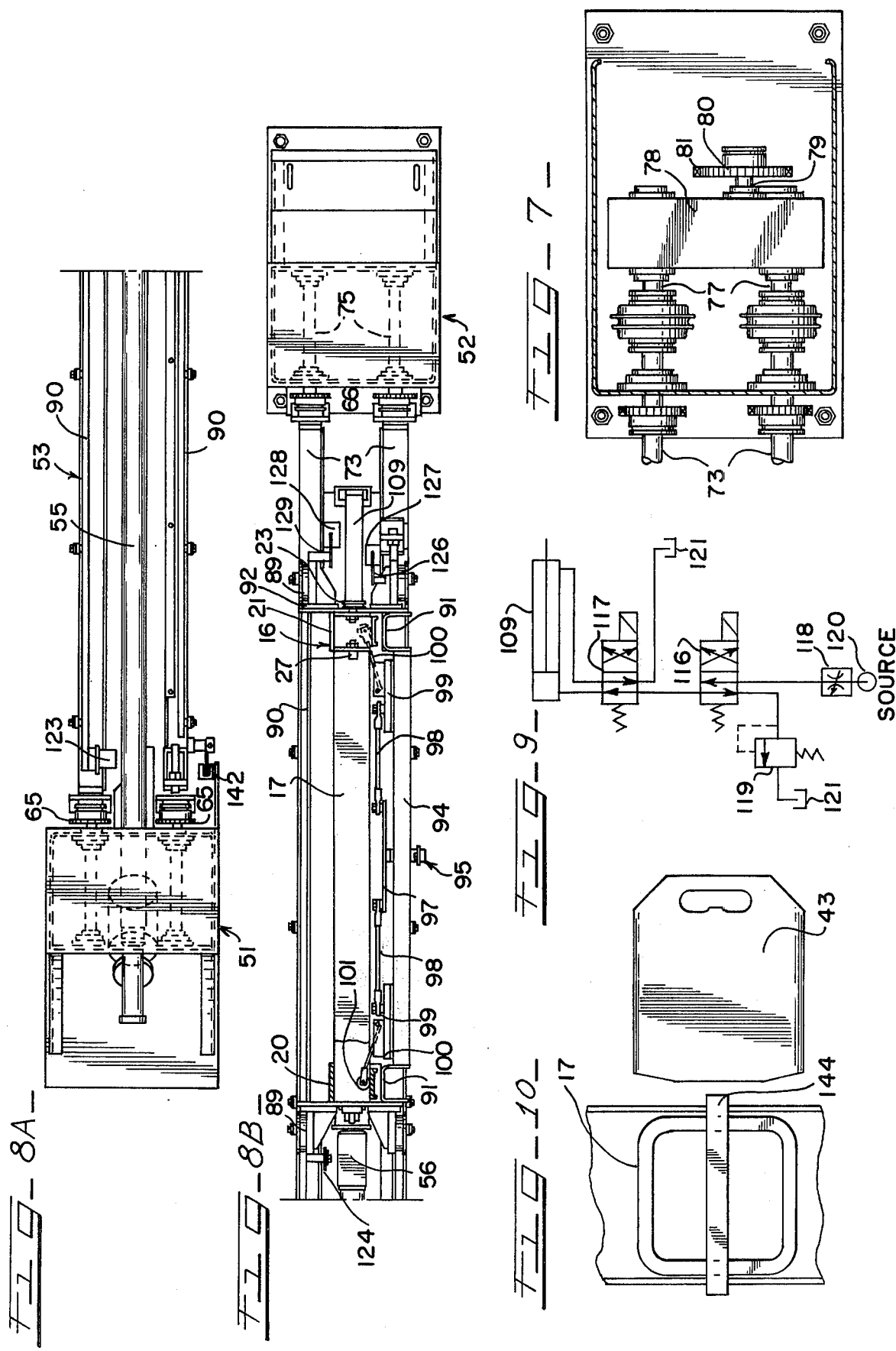

METHOD AND APPARATUS FOR STUFFING LOAF MOLDS

This invention relates in general to the stuffing of meat material into molds for producing a finished loaf product, and more particularly to a stuffing mechanism and method for handling and controlling the stuffing of the molds, and still more particularly to a method and mechanism for stuffing a magazine of loaf molds.

The stuffing method and mechanism of the present invention is particularly useful in a continuous loaf processing system where a plurality of molds of meat material are continuously processed to produce a ready-to-eat loaf food product. While the stuffing mechanism and method of the invention will be illustrated as utilized with a continuous loaf processing system, it can be appreciated that it may be utilized wherever there is a need to stuff molds with a food material for processing. The loaf food product illustrated as being made with the present invention are loaves of meat which are made from the processing of loaf molds in cooking and chilling chambers where the molds are first loaded with a stuffable meat material, such as sausage batter or chunk meat. Specifically, magazines of molds filled with a meat material in a continuous loaf processing system are transported through a cooking chamber to obtain cooking of the meat material and then a chilling chamber to chill the meat material prior to removal of the loaf meat from the molds. Following chilling, the loaves of meat are removed at a product knockout station. Thereafter, the magazines of molds are transported to a mold wash station where the molds are properly washed, and then to a release agent application station where the molds are coated with a suitable release agent in preparation for the next stuffing operation. In a closed loop, the magazines of molds pass through cooking, chilling, product knockout, wash, and release agent application stations. The stuffing station is outside the closed loop, wherein a magazine is removed from the closed loop to the stuffing station at the same time a magazine of molds filled with meat material is transferred from the stuffing station back into the closed loop. Accordingly, the magazine of molds which is processed at the stuffing station is removed from the closed loop, passed through a stuffing loop, and reinserted back into the closed loop.

It is therefore an object of the present invention to provide a new and improved method for stuffing meat material into loaf molds, and an apparatus for carrying out the method.

Another object of the invention is in the provision of a method and apparatus for stuffing a plurality of molds in a magazine with a stuffable food material and obtain properly stuffed molds.

Other objects, features and advantages of the invention will be apparent from the following detailed disclosure, taken in conjunction with the accompanying sheets of drawings, wherein like reference numerals refer to like parts, in which:

FIG. 5 is an enlarged transverse sectional view taken through the stuffing platform and substantially along line 5—5 of FIG. 3;

FIG. 6 is an end elevational view of the indexing drive for the stuffing platform and taken along line 6—6 of FIG. 3;

FIG. 7 is a top plan view of a part of the indexing drive and taken substantially along line 7—7 of FIG. 3;

FIGS. 8A and 8B together are a top plan view of the stuffing mechanism showing the stuffing carriage at its home position;

FIG. 9 is a schematic diagram of one form of hydraulic circuitry for the hydraulic cylinder which drives the carriage to the stuff position and retards return of the carriage to the home position;

FIG. 10 is an elevational end view of one mold and a slip-on cover for closing the open end of the mold;

FIG. 11 is a perspective view of the open end of a mold and the cutoff cover partially in place on the mold; and FIG. 12 is a detailed sectional view taken substantially along line 12—12 of FIG. 11.

Figure 1:
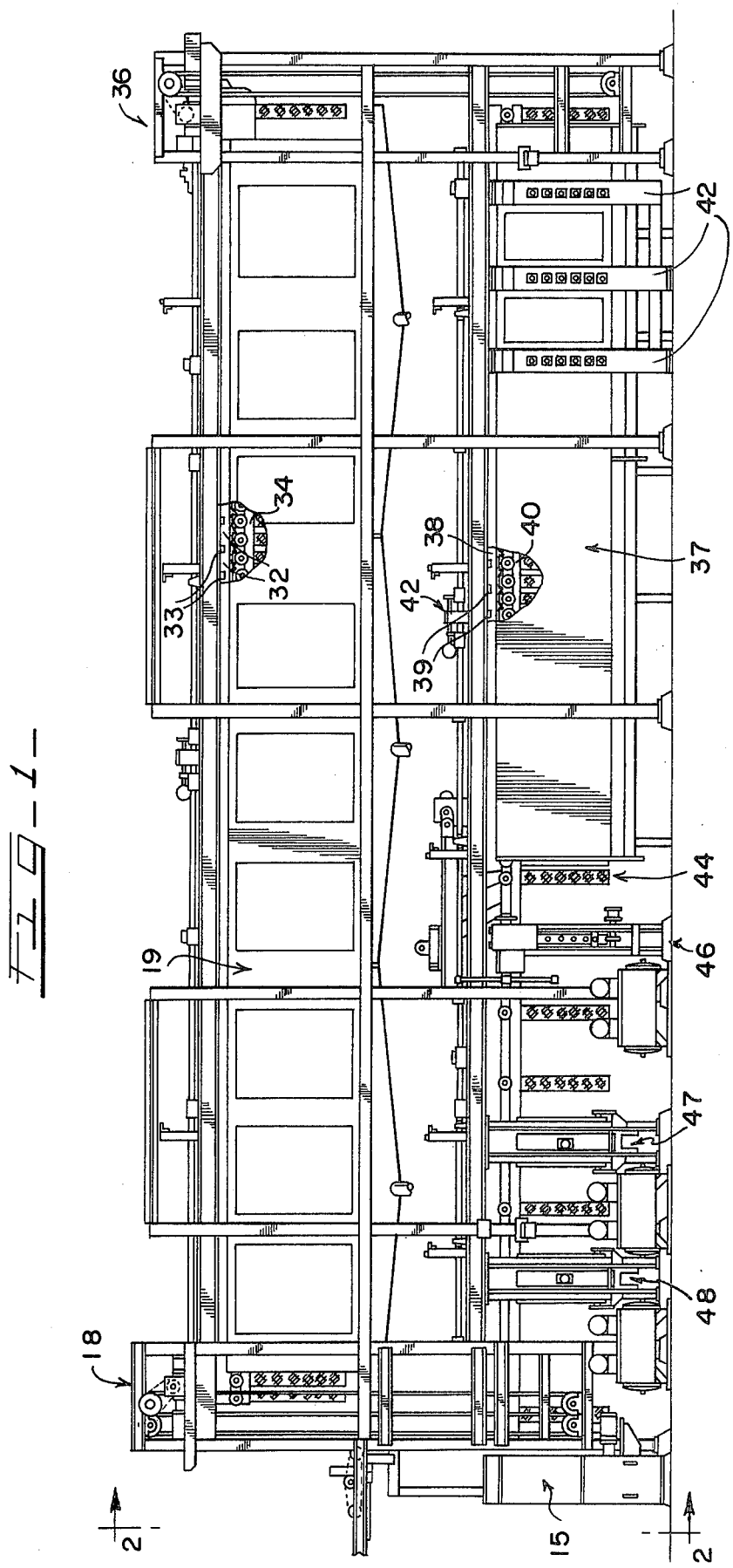
FIG. 1 is an elevational view of an apparatus for carrying out continuous loaf processing of a food material and which utilizes the stuffing method and mechanism of the present invention.

Referring now to the drawings, and particularly to FIG. 1, an overall view of the continuous loaf process apparatus is shown in which the stuffing mechanism and method of the invention is utilized. The stuffing mechanism of the invention is generally designated by the numeral 15 where a magazine of loaf molds 16, FIG. 3, which includes a plurality of horizontally extending and vertically arranged loaf molds 17 are filled with a suitable meat material. A plurality of magazines of molds are moving through the system at all times. Following the stuffing of the molds of magazines with a suitable stuffable meat material, the magazine is transferred by a transfer mechanism 18 to a level where a cooking station or cooking zone 19 is located.

Figure 3:
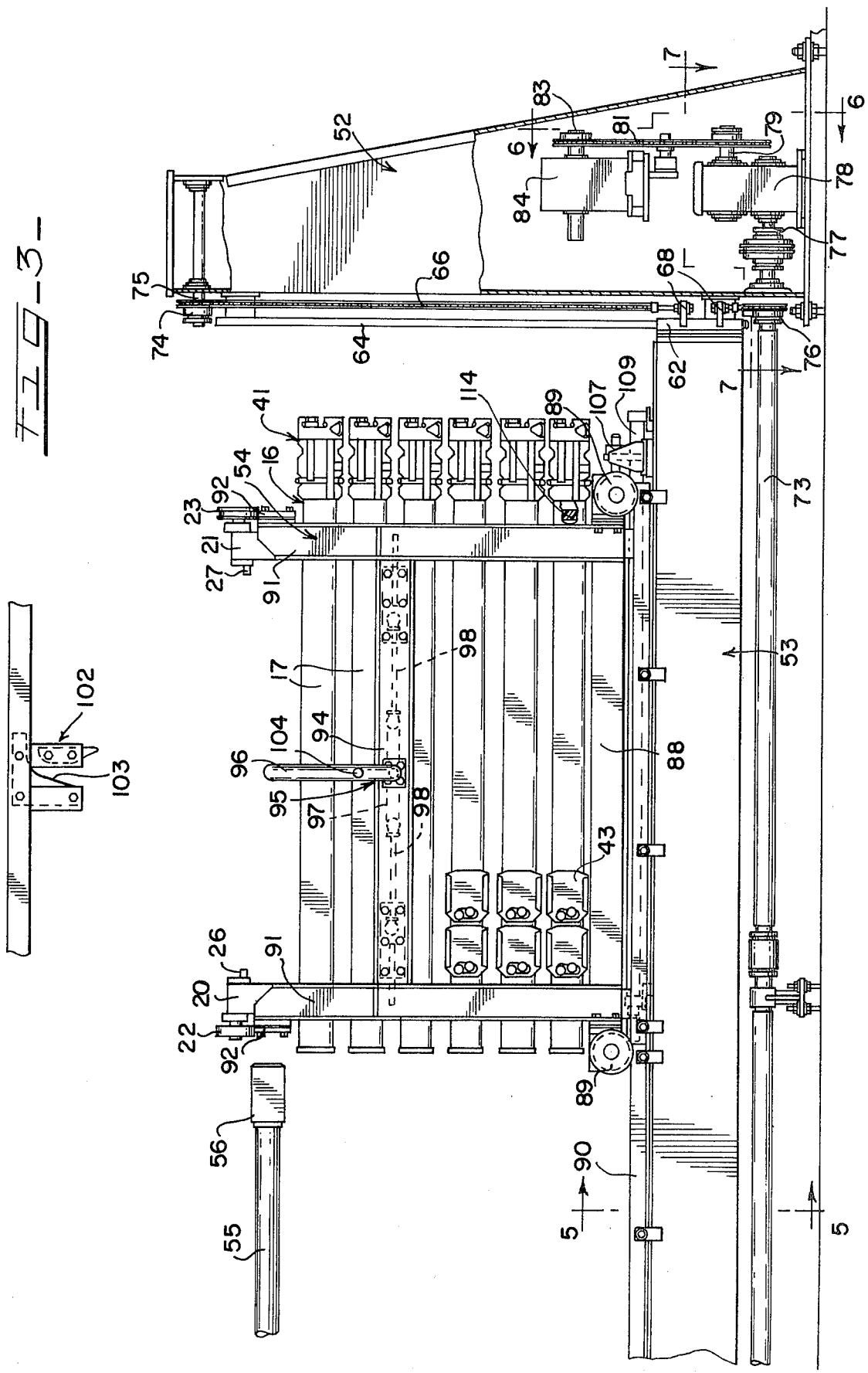
FIG. 3 is an enlarged elevational view of a part of the stuffing mechanism according to the invention with some parts omitted and other parts broken away for purposes of clarity, and illustrating a magazine of molds as just received by the stuffing carriage and locked into place.

Again, as seen in FIG. 3, the molds are interconnected and connected with a pair of vertically arranged forks or stringers 20 and 21 having mounted at their upper ends wheels or rollers 22 and 23 which are adapted to be guidably moved along parallel arranged and horizontally extending tracks or rails. Driving pins or dogs 26 and 27 are also mounted at the upper ends of the forks 20 and 21 opposite the wheels 22 and 23 for coacting with locking and moving bars of a conveyor system utilized in the overall process which moves the magazines in a step-by-step fashion. The magazine of molds and the conveyor are subjects of other applications owned by the assignee of this application.

The cook station 19 includes an elongated housing defining a cooking chamber 32 in which heat is generated for cooking the meat material within the molds by distributing hot water over the molds from overhead spray nozzles 33. Within the cooking chamber 32, the magazines are moved along cook rails or tracks 34.

When the magazines reach the end of the cooking station, they are lowered one by one from the level of the cook rails by means of a lowerer 36 to a lower level and in alignment with rails or tracks at a chilling station 37.

The chilling station is defined by an elongated housing having a chilling chamber 38 where a chilling action is imparted to the molds of the meat material therein by distributing cold water over the molds from overhead spray nozzles 39. Within the chilling chamber and along the lower level of the overall apparatus, chill rails 40 are provided for supporting the wheeled magazines. Again, a moving bar and locking bar conveyor is provided for engaging the pins 26 and 27 to drive the magazines in a step-by-step fashion along the rails.

Inasmuch as the meat material within the molds expands during cooking, a ratchet take-up mechanism 41 at one end of each mold is provided for allowing expansion and preventing distortion of the molds. The ratchet take-up mechanism is the subject of another application owned by the assignee of this application. The meat material shrinks or contracts during chilling, and accordingly, a plurality of squeeze mechanisms 42 coact with the ratchet take-up mechanisms to reduce the space within the mold and squeeze the meat material against the mold side walls and end cover. The squeeze mechanisms are also the subject of another application owned by the assignee of this application. As seen in FIG. 3, end covers 43 are supported on pins carried on the leading sides of the three lower molds of each magazine prior to application to the open ends of the molds, and as seen in FIG. 10, are applied over the flanged open ends of the molds to close the open ends through which the stuffing operation is accomplished. At the first position outside the chilling chamber 37, and generally indicated by the numeral 44 in FIG. 1, the end covers 43 are removed from the molds.

Following removal of the end covers from the molds, the magazines are advanced to the product knockout station 46 where the product is removed from the molds and placed on receiving trays. The product knockout and receiving tray assembly is the subject of another application owned by the assignee of this application. The spacing between the magazines is increased at this point to provide ample room for the subsequent stations. Following removal of the loaf meat product, the magazines of molds are then prepared for the next stuffing operation by washing the molds at the mold wash station 47 and by applying a suitable release agent at the release agent application station 48. Thereafter, if a magazine of molds has been completely stuffed at the stuffing station 15 and is about to be reinserted into the closed loop, a magazine of molds from the chill rails 40 will be removed from the closed loop to a storage area at the stuffing station. In the event that the stuffing operation is incomplete, the magazine of molds to be advanced to the stuffing station will by pass the stuffing station and be transported to the cook rails to be driven through the cook station. The overall continuous loaf processing system is the subject of another application owned by the assignee of this application.

Figure 2:
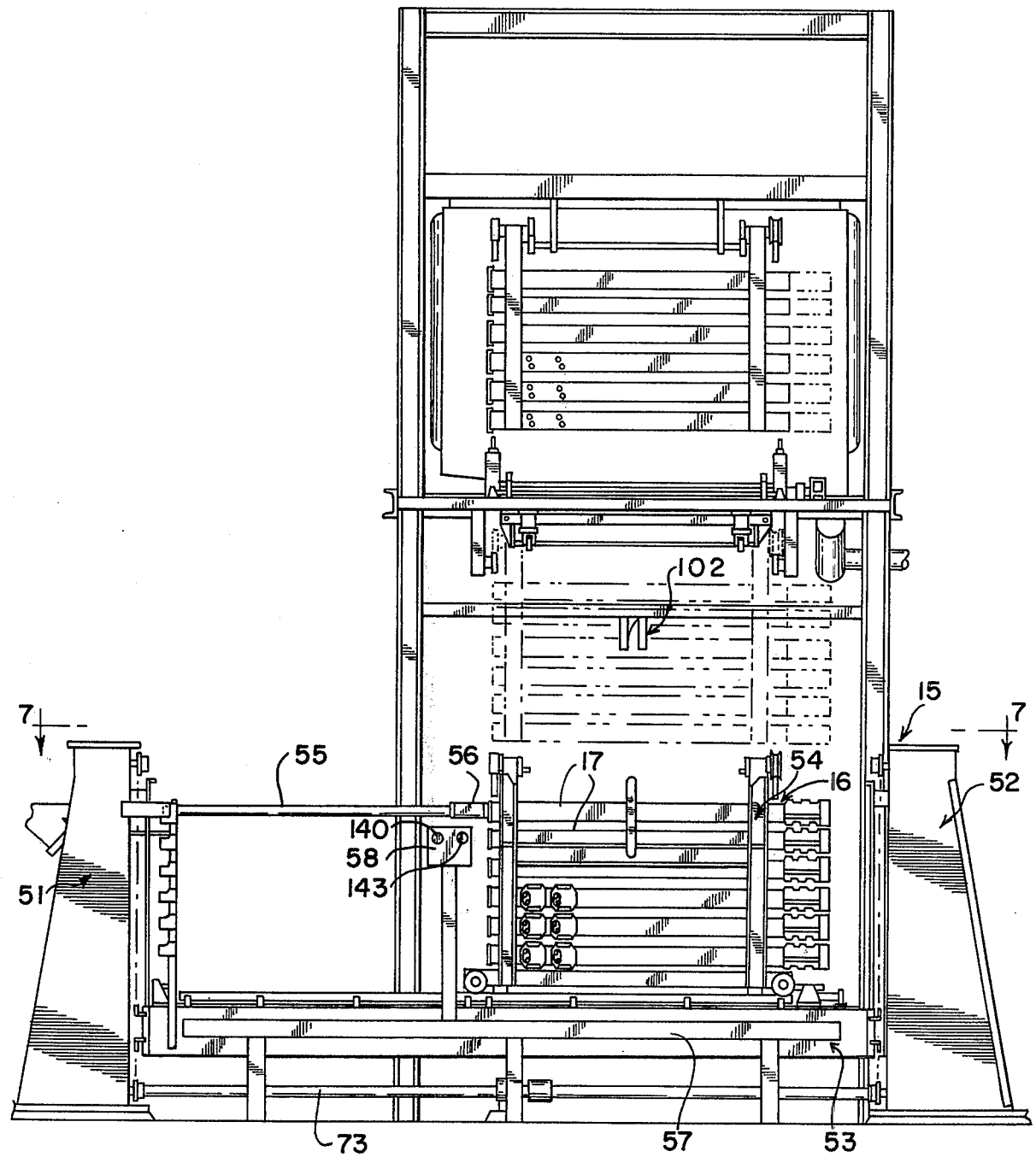
FIG. 2 is an end elevational view of the end of the apparatus in FIG. 1, showing the stuffing mechanism according to the invention and taken generally along line 2—2 of FIG. 1, and illustrating a magazine of molds at the stuffing carriage and the stuffing platform indexed so that the first mold aligns with the stuffing horn.

Referring now generally to FIG. 2, the stuffing mechanism 15 includes generally a pair of opposed upstanding support housings or structures 51 and 52 between which is mounted for vertical movement a stuffing platform 53. A stuffing carriage 54 is mounted on the stuffing platform 53 for movement therealong. Cantileverly supported on the end of a boom 55 is a stuffing horn 56. The boom 55 is supported from the support housing 51. A single operator mans the stuffing mechanism from a catwalk 57 arranged along the stuffing mechanism and on which is mounted a control panel 58.

Figure 4:
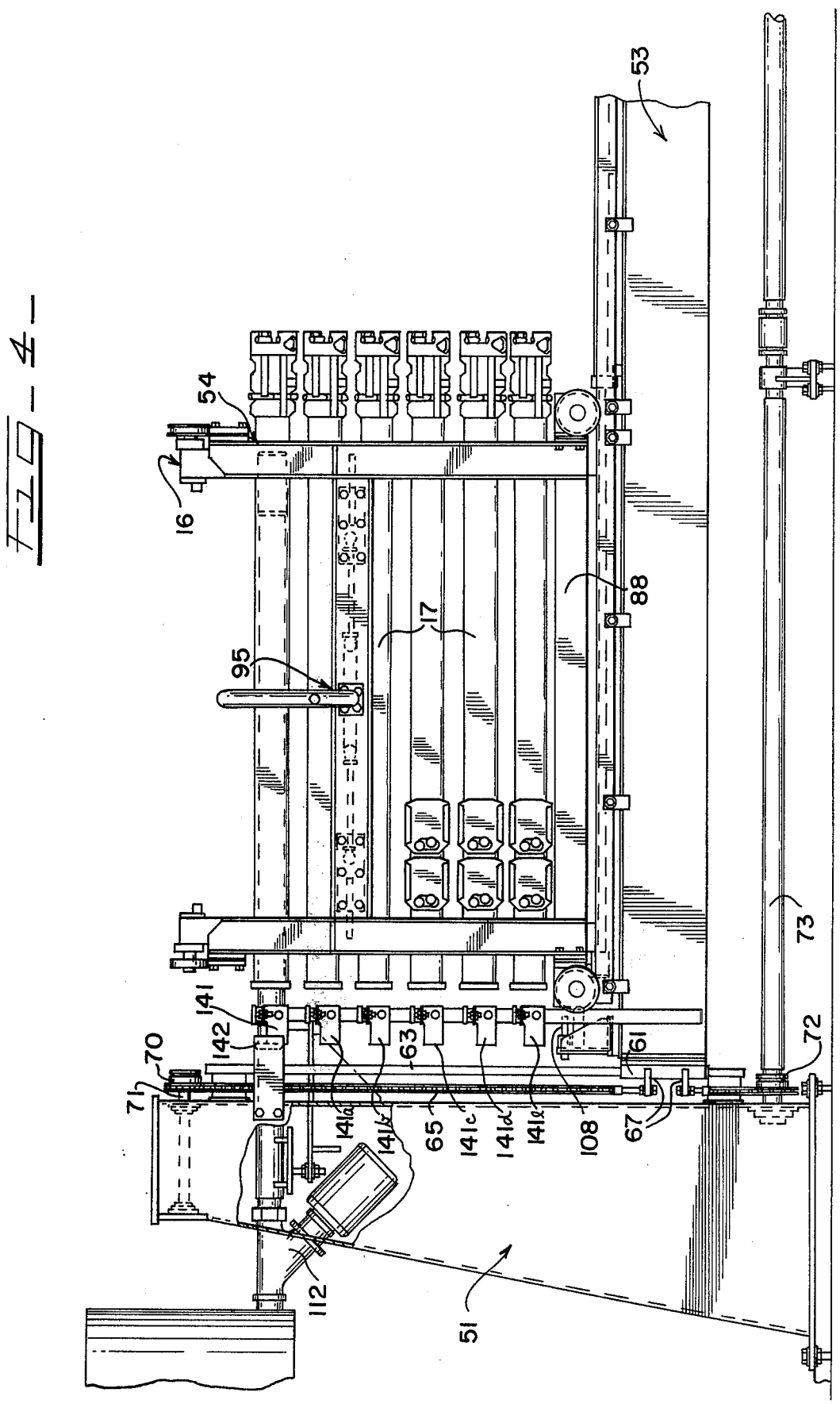
FIG. 4 is an enlarged elevational view of the other part of the stuffing mechanism according to the invention with some parts omitted and other parts broken away for purposes of clarity and illustrating the stuffing carriage in the position where the first mold is moved onto the stuffing horn.

The stuffing platform 53 extends horizontally between the upright support structures 51 and 52 and includes guideways 61 and 62 at opposite ends slidably received along vertically extending guide rails 63 and 64 that are respectively mounted on the upright support housings 51 and 52, as seen most clearly in FIGS. 3 and 4. The platform is supported along and movable along the guide rails 63 and 64 by chains 65 and 66. As best seen in FIGS. 8A and 8B, a pair of chains 65 and a pair of chains 66 are provided at opposite ends of the platform and connected to the front and back sides of the platform by means of brackets 67 and 68, as seen in FIGS. 3 and 4. The chains 65 are trained around the sprockets 70 mounted on idler shafts 71 at the upper end of the support housing 51 and on sprockets 72 mounted on elongated drive shafts 73 at the lower end of the housing 51. Similarly, the chains 66 are trained over sprockets 74 mounted on idler shafts 75 at the upper end of the support housing 52 and over sprockets 76 mounted on the drive shafts 73 at the lower end of the housing 52. The drive shafts 73 are suitably connected to a pair of output shafts 77 of a gear box 78 having a single input shaft 79. A sprocket 80 mounted on the input shaft 79 is driven through a chain 81 trained thereover and over a sprocket 82 mounted on the output shaft 83 of a gear box 84. The gear box 84 is suitably driven by a motor 85. Accordingly, the motor 85 serves to drive the stuffing platform 53 vertically along the guide rails 63 and 64.

The stuffing carriage 54, as seen particularly in FIGS. 2, 3 and 4, includes a horizontally extending base 88 having a pair of wheels 89 mounted at each end and riding on a pair of tracks 90 that are secured to the stuffing platform 53. The wheels 89 are flanged at the outer peripheries in order to guide movement of the carriage along the tracks and prevent lateral movement relative to the tracks so that the molds 17 in a magazine mounted on the carriage will move along a rectilinear path parallel to the tracks 90. A pair of vertically extending and horizontally spaced apart upstanding channel arms 91 are secured at their lower ends to the base 88 and provided at their upper ends with carriage tracks 92 extending perpendicular to the base onto which the wheels 22 and 23 ride when a magazine is pulled onto the stuffing carriage. Accordingly, the tracks 92 of the stuffing carriage support the magazine 16 when in place on the carriage. A hold down 93 prevents raising of the stuffing carriage from the tracks 90 and includes a bar 93a mounted on the stuffing platform 53 and a bar 93b coacting with the bar 93a and mounted on the stuffing carriage 54.

A cross bar 94 extending between the channel arms 91 supports a locking mechanism 95 for locking a magazine to a carriage. As seen in FIG. 8B, the side of the carriage facing the overall machine and the storage area from which magazines are manually moved to the stuffing carriage is open so as not to interfere with movement of a magazine onto the stuffing carriage. A magazine is moved onto the stuffing carriage until the forks 20 and 21 abut against the upstanding channel arms 91. The locking mechanism 95 is then manually actuated to lock the magazine to the stuffing carriage. The locking mechanism 95 includes a handle 96 extending from a shaft pivotally mounted in the cross arm or cross bar 94 and having connected thereto a toggle linkage including a toggle bar 97 and toggle links 98, which in turn are connected to slidably mounted blocks 99 having mounted thereon spring arms 100. Rollers 101 are mounted on the ends of the spring arm 100 which engage the forks 20 and 21, as seen in FIG. 8B, when the locking mechanism is actuated into locked position to lock a magazine onto the carriage. It can be appreciated that rotation of the handle 96 will retract the spring arms 100 and rollers 101 from engagement with the forks of a magazine to allow the magazine to be removed from the stuffing carriage when desired.

When the molds in the magazine have been completely filled and the stuffing platform is elevated such that the magazine can then be transferred onto the top elevator by the center transfer mechanism, the unlocking mechanism 95 is automatically actuated by an unlocking assembly 102 including a cam 103 which engages a cam roller or follower 104 mounted on the handle 96 causing rotation of the handle 96 to return the spring arms 100 and rollers 101 to the unlock position.

The stuffing carriage 54 is shown in its home position where the frame 88 abuts against a stop or bumper 107. Likewise, when the stuffing carriage is in position to commence the filling cycle, the frame or base 88 engages a stop or bumper 108 adjacent the support housing 51. The stuffing carriage is driven from the home position shown in FIG. 3 to the position shown in FIG. 4 by the hydraulic cylinder 109 anchored to the stuffing platform 53 wherein the piston rod of the cylinder is connected to the leading side of the stuffing carriage by means of a bracket 110, as shown in FIG. 5. The carriage 54 is returned to its home position by the pressure of the meat material being discharged from the stuffing horn 56 and acting on the carriage through the mold. After the product gate 112, FIG. 4, has been opened to allow a source of pressurized meat material to be discharged from the stuffing horn 56, the pressure of the material against the closed end of the mold drives the carriage to its return position. As seen in FIG. 3, the closed ends of the mold include a plastic plug 114, which is associated with a ratchet take-up mechanism 41.

During filling of the mold, it is necessary to retard the movement of the stuffing carriage 54 in order to obtain proper filling of the mold with meat material. This is accomplished by a suitable retarder circuit connected to control circuit for the hydraulic cylinder 109, such as shown in FIG. 9. This rather simplified version of the hydraulic circuitry for operating the cylinder 109 includes solenoid operator control valves 116 and 117, a flow control valve 118 for regulating the carriage speed onto the horn, and an adjustable relief or pressure unloading valve 119 for regulating the retarding force. Both valves 116 and 117 are shown in their spring-return de-energized position. A suitable pressure source 120 is connected to the flow control valve 118 and reservoir is indicated at 121. When it is desired to drive the first mold onto the stuffing horn and therefore drive the stuffing carriage 54 toward the support housing 51, the valve 116 is energized to connect the source through valve 117 to the end of the cylinder 109 to cause movement of the stuffing carriage toward the support housing 51. A limit switch 123 mounted on the stuffing platform, FIG. 8A, is actuable by a flag or actuator 124 mounted on the leading end of the carriage, FIG. 8B, to de-energize the valve 116 which automatically connects the retarding circuit to the cylinder 109. Actuation of the limit switch 123 also opens the product gate 112 to commence or initiate the filling cycle of the mold and cause pressurized meat material to be discharged from the stuffing horn into the mold. The end of the cylinder 109 loaded with hydraulic fluid by virtue of driving the hydraulic carriage toward the support housing 51 is now connected to the retarder circuit through the pressure relief valve 119. The set pressure of the valve 119 sets up a force in the stuffing carriage opposing the pressure of the meat material to retard the movement of the stuffing carriage and assure proper filling of the mold. The relief valve 119 can be adjusted to vary the set pressure depending upon what is desired for the particular type of meat material being processed.

Just before the stuffing carriage reaches the home position, a flag or vane 126 mounted on the stuffing carriage actuates a limit switch 127 to close the product gate 112 and end the discharge of meat material from the stuffing horn. A second limit switch 128 is actuated by a flag or vane 129 mounted on the stuffing carriage and serves to sense the position of the stuffing carriage when it is in full home position, so that the platform may thereafter be indexed to align another mold with a stuffing horn. This prevents any possible accidental movement of the stuffing carriage when the molds may interfere with the stuffing horn. It can be appreciated that any suitable type of retarding circuit may be provided for the hydraulic cylinder 109 to retard the rate of return of the stuffing carriage in order to properly assure filling of the mold with the meat material. It will be further appreciated that the meat material has been vacuumized or deaerated prior to being delivered to the stuffing horn by any suitable system.

The valve 117 in the hydraulic circuitry of FIG. 9 is energized only when it is desired to return the stuffing carriage to its home position by operation of the hydraulic cylinder 109. At that time, both valves 116 and 117 are energized to apply the pressure to the end of the cylinder to cause return of the stuffing carriage to the home position.

Following the filling of a mold, a cutoff cover 133, FIGS. 11 and 12, is applied to the open end of the mold to cut off any meat fibers that are protruding beyond the end of the mold. As seen particularly in FIG. 12, the cutoff cover includes a sharpened leading edge 134 which engages the meat material as the cutoff cover is inserted into place over the end of the mold. Thereafter, as will be more clearly hereinafter explained, the cutoff cover is replaced with a regular slip-on cover 43.

In the operation of the stuffing mechanism, the operator first manually pulls a magazine of molds 16 onto the stuffing carriage tracks 92 when the stuffing carriage and platform are positioned, as shown in FIG. 3. In this position, the tracks 92 align with the chill tracks or rails 40 at the lower section of the overall apparatus. It may also be noted in FIG. 3 that at this position, the top most mold is not in alignment with the stuffing horn or head 56. After the magazine is properly loaded onto the stuffing carriage, the operator then locks the magazine into place by actuating the locking mechanism 95.

The stuffing mechanism is then ready to commence stuffing operations, after which the operator manually depresses the stuff button 140 located on the control panel 58, as seen in FIG. 2, that commences a stuffing cycle. Assuming here that the limit switch 128 properly senses the stuffing carriage in its home position, the stuffing platform drive is energized to index or elevate the stuffing platform until the first or top most mold 17 is in alignment with the stuffing horn. At this position, a vane or limit switch actuator 141 mounted on the stuffing platform adjacent the supporting housing 51 actuates a limit switch 142 to stop the platform drive so that the stuffing horn is in proper alignment with the mold. After a predetermined time delay, the hydraulic cylinder 109 of the stuffing carriage drive is then actuated to drive the mold onto the stuffing horn. It will be appreciated that the cross section of the stuffing horn is approximately the size of the interior of the mold and of substantially the same cross-sectional shape. When the mold reaches the position so that the stuffing carriage is as shown in FIG. 4 and the stuffing horn is adjacent the closed end of the mold, actuation of the limit switch 123 stops the carriage by controlling the hydraulic circuit for the cylinder 109 and also causes opening of the product gate 112 to initiate the discharge of pressurized meat material from the stuffing horn into the mold. The pressure of the stuffable meat material then drives the carriage back to its home position by applying a force through the mold and through magazine of the mold and the stuffing carriage. The retarding circuit, and particularly the relief valve 119, retards the rate of return of the stuffing carriage to cause proper loading of the mold with the meat material. Just before the stuffing carriage reaches the home position, the limit switch 127 is actuated to shut off the product gate, and as the stuffing carriage reaches the home position, the stuffing horn will just clear the end of the mold as shown in FIG. 2. At this point, the cutoff cover 133 is applied to the mold.

Nothing further will happen unless the operator once again depresses the stuff button 140, after which the platform drive is energized to index the platform upwardly so that the next mold 17 is in alignment with the stuffing horn 56, and after suitable delay, the carriage is then driven so that the second mold is driven onto the stuffing horn and the stuffing cycle is repeated to fill the second mold. When the second mold has returned to the home position after being filled, the cutoff cover 133 is removed from the upper mold and applied to the mold just filled. A slip-on cover 43 is then applied to the upper mold. This process is repeated until all of the molds have been filled with meat material. When the last mold has been filled and the stuff button has again been depressed, the stuffing platform elevates the magazine of molds so that the lowermost mold is one step above the stuffing horn, after which the cutoff cover is removed and replaced with a slip-on cover. Thereafter, the operator depresses a full travel button 143, after which the platform elevates the magazine to the position where the stuffing carriage rails are in alignment with the rails of the top elevator at the center transfer mechanism position. The top elevator then transports the magazine into alignment with the cock rails so that the top transfer can transfer the magazine onto the cook rails for movement through the cook zone. After the center transfer mechanism completes the transfer of a magazine from the stuffing carriage to the top elevator, the stuffing platform returns to home position for receiving the next magazine of molds. The mechanism removing magazines from the closed loop for the stuffing station and reinserting same into the closed loop at the cook station forms no part of the present invention and is the subject of another application owned by the assignee of this application.

It can be appreciated that while the stuffing platform 53 is being indexed upwardly to sequentially place the next mold on the magazine in alignment with the stuffing horn 56, the stuffing platform is stopped each time in aligned position by actuation of limit switch 142 by the other flags 141a, 141b, 141c, 141d and 141e, all mounted on the stuffing platform. The position of the flags 141 may be adjusted to provide proper aligned relationship between the stuffing horn and the molds. However, the molds are equally spaced apart vertically, and accordingly, the flags 141 can also be equally spaced apart. Suitable electrical controls coordinate the operation of the stuffing mechanism and the operation of the overall loaf processing system.

It will be appreciated the stuffing rate and the retarding pressure are adjusted to give a desired stuffing time, while the shutoff of meat material discharge from the stuffing horn is set so that the end of the loaf mold just clears the stuffing horn by an amount sufficient to allow the insertion of the cutoff cover. Further, when the stuffing platform is indexed upward to place the next mold in alignment with the stuffing horn after removal of the cutoff cover, an aluminum anode strip 144 is laid across the open face of the mold as the slip-on cover 43 is pushed into place, as shown in FIG. 10. Inasmuch as the molds and the covers are of stainless steel, the aluminum anode strip prevents attack of the stainless mold and cover by the salts in the meat material. Any suitable anodic material may be used other than aluminum. Accordingly, the anodic strip provides cathodic action to prevent pitting of the stainless steel mold and cover. The use of the anodic strip forms no part of the present invention, and it should be appreciated that it is the subject matter of a separate application owned by the assignee of this application.

It will be understood that modifications and variations may be effected without departing from the scope of the novel concepts of the present invention, but it is understood that this application is to be limited only by the scope of the appended claims.

The invention is hereby claimed as follows:

1. Apparatus for stuffing meat material into a horizontally arranged elongated tubular loaf mold open at one end and closed at the other end, which apparatus comprises: a stationary stuffing horn, a stuffing platform, a stuffing carriage for receiving the mold and movable along the stuffing platform relative the stuffing horn, means mounting the stuffing platform for vertical movement to align the mold with the stuffing horn, means for driving the carriage to position the stuffing horn within the mold at the closed end thereof, control means for connecting the stuffing horn to a pressurized source of meat material, means for actuating the control means to commence discharging meat material from the stuffing horn, the pressure of the meat material being such as to force the mold and carriage to move off the stuffing horn, means retarding the movement of the carriage to assure proper filling of the mold, and means for actuating the control means to end the discharge of meat material from the stuffing horn.

2. Apparatus as defined in claim 1, wherein said retarding means includes a fluid cylinder mounted on the platform and connected to the carriage, and a retarding circuit connected to the cylinder for controlling the return movement of the carriage.

3. Apparatus for handling a magazine of loaf molds and stuffing meat material into the molds one at a time, wherein the magazine of loaf molds includes a plurality of horizontally extending and vertically arranged in equally spaced apart relation elongated loaf molds open at one end and closed at the other end, said apparatus comprising: a horizontally extending stuffing platform, means for guidably mounting the platform for vertical movement, means for driving the platform in step-by-step fashion to index same at a plurality of vertical positions, a stuffing carriage mounted for movement along the platform along a path perpendicular to the path of platform movement, said carriage adapted to receive and have secured thereto a magazine of loaf molds, a stuffing horn mounted in superposed relation over the platform and in alignment with the vertical center axes of the loaf molds of a magazine mounted on the stuffing carriage, said stuffing horn being connectable to a source of pressurized meat material, means for driving the carriage toward the stuffing horn so that the stuffing horn enters the open end of the mold and until the stuffing horn is positioned adjacent the closed end of the mold, manually actuated means for controlling the platform drive to index a mold into direct alignment with the stuffing horn and to commence a fill cycle by causing the carriage to move a mold onto the stuffing horn and initiate flow of meat material through the stuffing horn, the pressure of the meat material being such as to drive the carriage towards its home position, and means retarding the movement of the carriage toward the home position to assure proper filling of the mold with meat material.

4. Apparatus as defined in claim 3, which further includes means for stopping flow of meat material through the stuffing horn just prior to the stuffing carriage reaching home position.

5. Apparatus as defined in claim 4, which further includes means sensing the stuffing carriage at the home position.

6. Apparatus as defined in claim 5, wherein said means for driving the stuffing carriage in the direction to position the stuffing horn adjacent the closed end of a mold includes a hydraulic cylinder mounted on the stuffing platform having a piston rod connected to the stuffing carriage.

7. Apparatus as defined in claim 6, wherein said means for retarding return movement of the stuffing carriage toward the home position includes a hydraulic retarding circuit for said hydraulic cylinder.

8. Apparatus as defined in claim 7, wherein said means for securing a magazine to the carriage includes a manually operable locking means.

9. Apparatus as defined in claim 8, which further includes means for sensing the positions of the molds when aligned with the stuffing horn.

10. Apparatus for stuffing meat material into a magazine of horizontally extending and vertically aligned molds open at one end and closed at the other end, which apparatus comprises a stuffing horn, control means for connecting the stuffing horn to a pressurized source of meat material, support means for said magazine of molds, means mounting said stuffing horn and magazine of molds for relative movement therebetween such that the stuffing horn may be sequentially vertically aligned with each mold and move within each mold and be positioned therein at the closed end thereof, means for driving the stuffing horn and magazine support means such that the stuffing horn is at the closed end of the mold aligned therewith, means for actuating said control means to commence discharging meat material from the stuffing horn and filling the mold aligned with the horn with meat material and thereby cause the stuffing horn and magazine support means to separate until the mold is full of meat material, means retarding the separation of the stuffing horn and magazine support means during the filling of the mold, and means for actuating the control means to end the discharge of meat material from the stuffing horn.

* * * * *